UNITED STATES PATENT OFFICE.

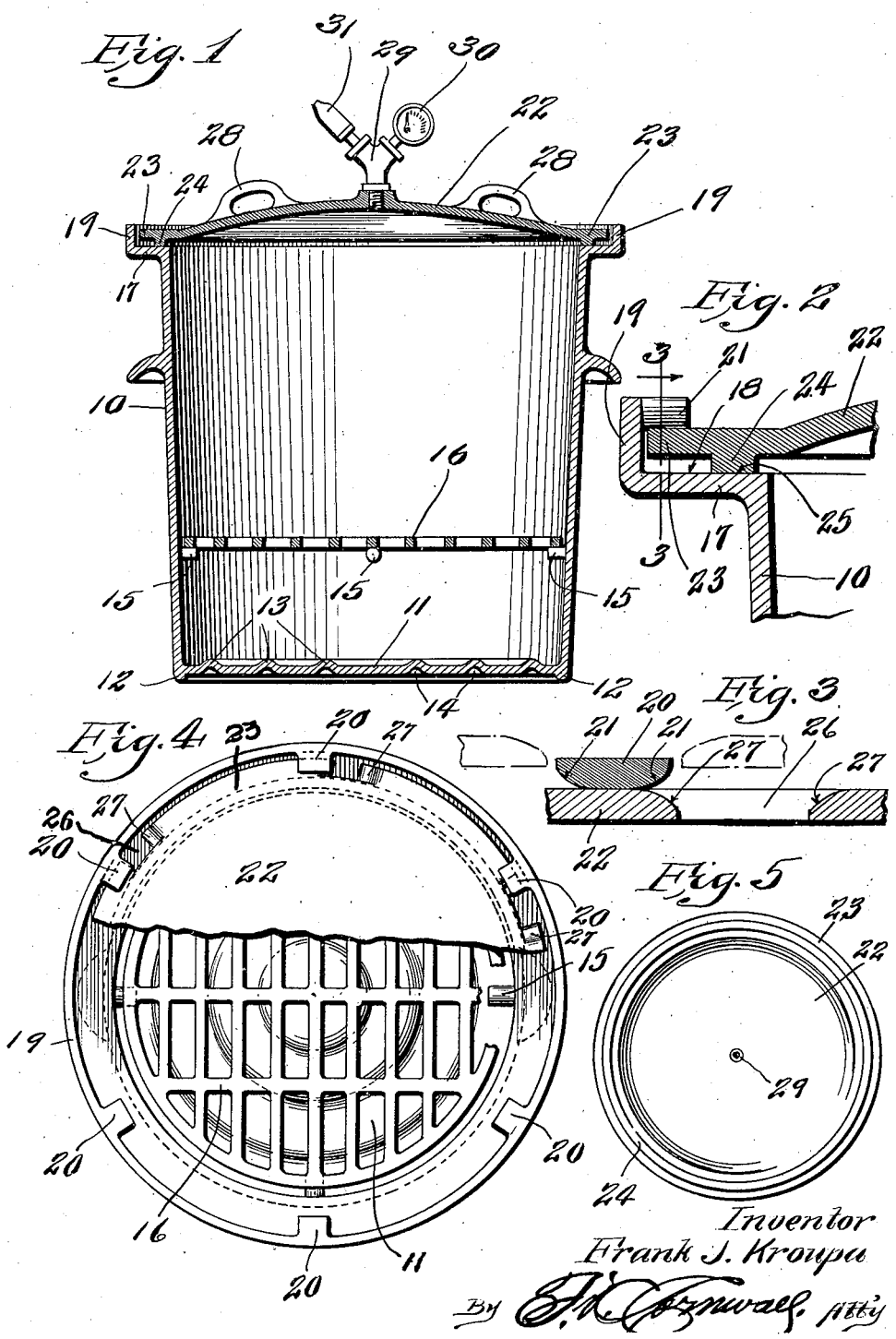

FRANK J. KROUPA, OF ST. LOUIS, MISSOURI.

STEAM-COOKER.

1,369,249. Specification of Letters Patent. Patented Feb. 22, 1921.

Application filed April 14, 1920. Serial No. 373,915.

*To all whom it may concern:*

Be it known that I, FRANK J. KROUPA, a citizen of the United States, residing at St. Louis, Missouri, have invented a certain new and useful Improvement in Steam-Cookers, of which the following is a full, clear, and exact description, such as will enable others skilled in the art to which it appertains to make and use the same, reference being had to the accompanying drawings, forming part of this specification.

My invention relates generally to culinary utensils and more particularly to a steam cooker, the principal objects of my invention being to provide a relatively simple cooking utensil which, by virtue of its construction, is capable of being easily and cheaply produced to provide the utensil with a readily removable cover; the same being constructed in a single piece and carrying a steam gage and a safety valve; further, to construct the upper portion of the cooker and the edge of the cover so that when the latter is properly positioned on the body of the cooker, an air and steam tight joint will be formed between said parts without the use of a packing ring or gasket; to construct the bottom of the utensil so that it will not warp or buckle as a result of being subjected to relatively high temperatures; to provide the cooker with a readily removable rack that occupies a position a substantial distance above the bottom of the cooker so that the food to be cooked is maintained entirely above the body of water in the bottom of the cooker; and, further, to provide a simple and efficient utensil which in addition to being used as a steam cooker, can be advantageously used in processing fruits and vegetables while the same are being put up in glass or metal containers.

With the foregoing and other objects in view, my invention consists in certain novel features of construction and arrangement of parts, hereinafter more fully described and claimed, and illustrated in the accompanying drawings, in which—

Figure 1 is a vertical section taken through the center of a steam cooker of my improved construction.

Fig. 2 is an enlarged detail section of parts of the cooker body and the cover thereof and showing the means employed to produce a steam and air tight joint between the cooker body and cover.

Fig. 3 is an enlarged detail section taken approximately on the line 3—3 of Fig. 2.

Fig. 4 is a plan view of the cooker with a part of the cover broken away.

Fig. 5 is a view looking against the underside of the cover.

Referring by numerals to the accompanying drawings, which illustrate a practical embodiment of my invention, 10 designates the body of the cooker, the same being substantially cylindrical in form, and preferably cast from suitable metal such as aluminum. Formed integral with the lower end of the body 10 is a bottom plate 11, the undersurface of which is elevated slightly with respect to the lower edge of the wall of the body, thereby forming on said bottom plate a depending marginal rib or bead 12 which is adapted to rest directly upon the surface on which the cooker is positioned.

Formed integral with the bottom plate 11 and on the top surface thereof is a series of annular concentric ribs 13 and formed in the undersurface of said bottom plate immediately below said ribs are corresponding annular concentric grooves 14. This construction materially reinforces and strengthens the bottom plate 11 and prevents the same from buckling or warping when subjected to high degrees of heat.

Formed integral with and projecting inwardly from the wall of the body 10 and in a horizontal plane a substantial distance above the bottom plate 11 is a plurality of lugs 15 which serve as a support for a removable rack 16. This rack is preferably cast in a single piece and it is perforated or reticulated in any desired manner so as to permit steam and hot air to rise from the bottom of the cooker to the upper portion of the chamber therein.

Formed integral with the upper edge of the wall of body 10 is an outwardly projecting horizontally disposed flange 17, the upper face 18 of which is made relatively smooth by being suitably ground or machined. Formed integral with the outer edge of this flange is an upwardly projecting flange 19 and formed integral with the upper portion of the latter are inwardly projecting horizontally disposed lips or lugs 20 that have the end portions of their underfaces rounded or beveled upwardly and outwardly as designated by 21.

The cover for the cooker is formed in a single piece, preferably by casting, its central portion 22 being made slightly convex and its marginal portion terminating in a horizontally disposed flange 23. Formed integral with the underside of this flange is a depending annular rib 24, the underface 25 of which is made smooth by being suitably machined or ground and said underface is adapted to bear directly upon the smooth upper face 18 of flange 17 and coöperate therewith to form an air and steam tight joint.

Formed in the outer portion of the flange 23 are notches 26, the same being of sufficient width and spaced apart so as to receive the inwardly projecting lugs 20 and the upper surface of flange 23 to the sides of each notch or opening is rounded or beveled as designated by 27.

By reference to Fig. 3 it will be noted that these rounded or beveled surfaces 27 are oppositely disposed with respect to the rounded or beveled surfaces 21 on the undersides of the end portions of the lugs 20, such construction being employed in order to permit the flange 23 to ride easily beneath the upwardly projecting lugs 20 when the cover is fitted onto the top of the cooker and rotated for a short distance in either direction, and further, such construction is effective in tending to force the marginal portion of the cover downwardly, thereby causing the underface of rib 24 to tightly engage the finished upper surface 18 of flange 17 and provide an air and steam tight joint between the cover and the body of the cooker.

Formed integral with and projecting upwardly from the body 22 of the cover and preferably at diametrically disposed points are handles 28 by means of which the cover can be readily lifted and manipulated when applied to the cooker body.

Seated in the cover, and preferably at a central point thereon is a Y-connection 29, one of the arms of which carries a small steam gage 30 and the other arm carrying a suitable safety valve 31.

Thus when the cooker is in operation, the internal pressure can always be ascertained by an inspection of the gage 30 and if the internal pressure should rise to an abnormal degree, the safety valve will act to automatically relieve the excess pressure.

In applying the cover to the body of the cooker, said cover is turned so that the notches 26 therein coincide with the lugs 20 and said cover is now moved downward until the underface of rib 24 bears upon the upper surface of flange 17.

By manually engaging the handles 28, the cover is now rotated slightly in either direction and certain of the curved or beveled surfaces 27 at the ends of the notches 26 will move readily past the corresponding curved or beveled faces 21 on the lugs 20 and at the same time, the marginal portion of the cover will be forced downwardly with pressure to cause the finished face 25 on the underside of the rib 24 to engage the finished surface 18 and form a practically air and steam tight joint.

A reverse movement of the cover will bring the notches 26 into vertical alinement with the lugs 20 and this will permit the cover to be readily lifted from the body of the cooker.

The food to be cooked can be placed directly upon the rack 16 or in a suitable container which rests upon said rack and while so positioned, it will be subjected to the direct action of steam arising from the heated water in the bottom of the cooker. Likewise, cans or containers of fruit or vegetables which require processing while being put up can be placed in the cooker and subjected to the action of heat and steam.

During the warmer periods of the year and while the utensil is not being used as a cooker, it can be used for cooling or refrigerating purposes by placing ice in the lower portion of the container and placing the food or material to be kept cool on the rack 16.

A utensil of my improved construction is comparatively simple, can be easily and cheaply produced, is very strong and durable by reason of the fact that the body and cover are of cast construction, and said utensil is very efficient in use.

It will be readily understood that minor changes in the size, form and construction of the various parts of my improved utensil can be made and substituted for those herein shown and described, without departing from the spirit of my invention, the scope of which is set forth in the appended claim.

I claim:

A culinary utensil comprising a receptacle, a horizontally disposed flange projecting outwardly from the upper end of the wall of said receptacle, an upstanding flange on the outer edge of said horizontally disposed flange, lugs projecting inwardly from the upper end of said upstanding flange, the underfaces of the ends of said lugs being curved upwardly, a cover the underside of the edge of which is adapted to bear on the horizontally disposed flange on the upper end of the utensil body, there being notches formed in the edge of said cover, which notches are adapted to receive the inwardly projecting lugs on the upstanding flange, and the top face of said cover immediately adjacent to the sides of said notches being curved to coöperate with the curved underfaces of the ends of the lugs to cause the underside of the edge of the cover to fit snugly against the horizontally disposed flange on the body of the utensil when said cover is applied thereto.

In testimony whereof I hereunto affix my signature this 5th day of April, 1920.

FRANK J. KROUPA.